United States Patent [19]
Darmas, Sr.

[11] Patent Number: 5,762,393
[45] Date of Patent: Jun. 9, 1998

[54] VEHICLE SUN SHADE SYSTEM

[76] Inventor: Sidney G. Darmas, Sr., 37483 E. Hillcrest Dr., Slidell, La. 70460

[21] Appl. No.: 826,994

[22] Filed: Apr. 14, 1997

[51] Int. Cl.⁶ .................................................. B60J 11/00
[52] U.S. Cl. ........................................ 296/98; 246/136
[58] Field of Search ................ 296/136, 98; 280/762

[56] References Cited

U.S. PATENT DOCUMENTS

| | | | |
|---|---|---|---|
| 2,871,931 | 2/1959 | Hastings | 296/98 |
| 3,050,075 | 8/1962 | Kaplan et al. | 296/98 |
| 4,732,421 | 3/1988 | Ross et al. | 296/136 |
| 4,825,889 | 5/1989 | Monteith | 135/88 |
| 4,929,016 | 5/1990 | Kastanis | 296/136 |
| 4,952,007 | 8/1990 | Shahrokh | 296/136 |
| 5,230,545 | 7/1993 | Huang et al. | 296/136 |
| 5,516,181 | 5/1996 | Thompson | 296/98 |

FOREIGN PATENT DOCUMENTS

| | | | |
|---|---|---|---|
| 493116 | 9/1977 | Australia | 296/98 |
| 2177359 | 1/1987 | United Kingdom | 296/98 |

*Primary Examiner*—Gary C. Hoge
*Attorney, Agent, or Firm*—Joseph N. Breaux

[57] ABSTRACT

A vehicle sun shade system that includes a shade assembly including a shade housing including having a shade member mounted on a shade retraction mechanism in a manner to allow the shade member to be retracted into and deployed from the shade housing, a number of shade securing suction cups secured to leading edge of the shade member, and two shade assembly supports; a flexible, plastic, magnetic mounting mat secured to the shade housing by the shade assembly supports; and left and right window securing assemblies each including an adjustable length strap with a securing buckle and a window mount, one end of the adjustable length strap being secured to a shade assembly support, the window mount including a window edge channel and a buckle insert, the buckle insert being lockable to the securing buckle.

12 Claims, 3 Drawing Sheets

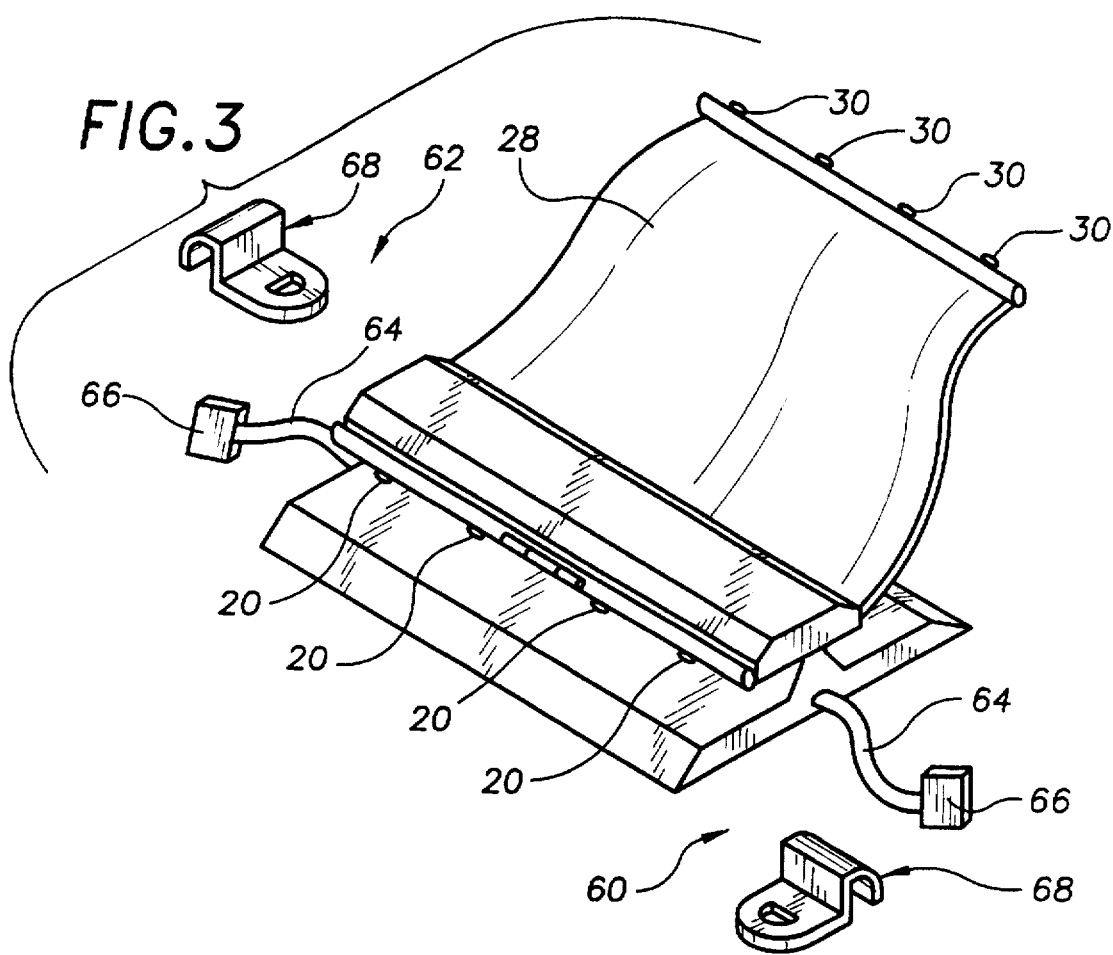
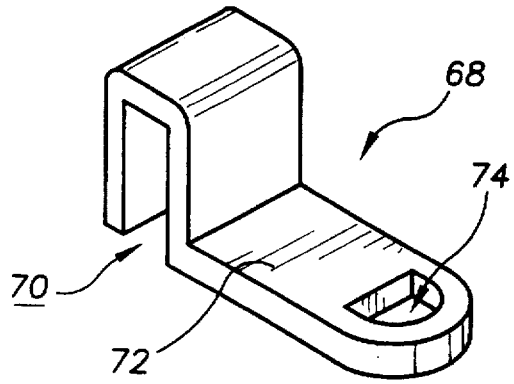
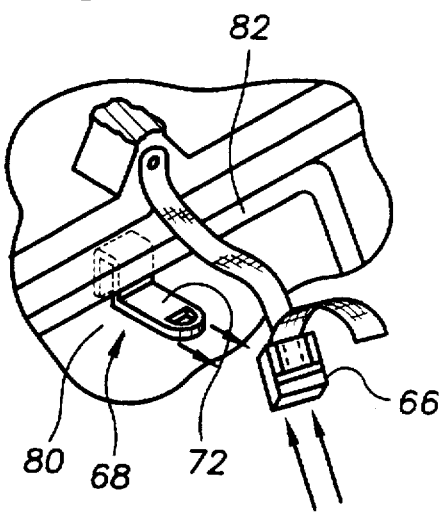

VEHICLE SUN SHADE SYSTEM

TECHNICAL FIELD

The present invention relates to sun shielding devices and more particularly to a sun shade system for vehicles that includes a shade assembly having a shade housing including having a shade member mounted on a shade retraction mechanism in a manner to allow the shade member to be retracted into and deployed from the shade housing, a number of shade securing suction cups secured to leading edge of the shade member, and two shade assembly supports; a flexible, plastic, magnetic mounting mat secured to the shade housing by the shade assembly supports; and left and right window securing assemblies each including an adjustable length strap with a securing buckle and a window mount, the window mount including a window edge channel and a buckle insert, the buckle insert being lockable to the securing buckle.

BACKGROUND OF THE INVENTION

The passenger compartment of a vehicle can become uncomfortably hot when the vehicle is left out in the sun. It would be a benefit, therefore, to have a sun shade device for shading the exterior portion of the vehicle that covers the passenger compartment and reduces heat build-up within the passenger compartment. Because, it can be inconvenient to install and remove a shade assembly, it would be a further benefit to have a sun shade system that can be easily installed and that includes at least one retractable shade member that can be deployed from a housing to cover at least a portion of the exterior of the vehicle. It would also be a benefit to have a shade system that included at least one non-permanent mounting system that can be used to install the shade system with little or no prior installation training.

SUMMARY OF THE INVENTION

It is thus an object of the invention to provide a vehicle sun shade system that includes a sun shade device for shading the exterior portion of the vehicle that covers the passenger compartment.

It is a further object of the invention to provide a vehicle sun shade system that includes at least one retractable shade member that can be deployed from a housing to cover at least a portion of the exterior of the vehicle.

It is a still further object of the invention to provide a vehicle sun shade system that includes at least one mounting system that can be used to install the shade system with little or no prior installation training.

It is a still further object of the invention to provide a vehicle sun shade system that includes a shade assembly including a shade housing including having a shade member mounted on a shade retraction mechanism in a manner to allow the shade member to be retracted into and deployed from the shade housing, a number of shade securing suction cups secured to leading edge of the shade member, and two shade assembly supports; a flexible, plastic, magnetic mounting mat secured to the shade housing by the shade assembly supports; and left and right window securing assemblies each including an adjustable length strap with a securing buckle and a window mount, the window mount including a window edge channel and a buckle insert, the buckle insert being lockable to the securing buckle.

It is a still further object of the invention to provide a vehicle sun shade system that accomplishes some or all of the above objects in combination.

Accordingly, a vehicle sun shade system is provided. The vehicle sun shade system includes a shade assembly including a shade housing including having a shade member mounted on a shade retraction mechanism in a manner to allow the shade member to be retracted into and deployed from the shade housing, a number of shade securing suction cups secured to leading edge of the shade member, and two shade assembly supports; a flexible, plastic, magnetic mounting mat secured to the shade housing by the shade assembly supports; and left and right window securing assemblies each including an adjustable length strap with a securing buckle and a window mount, one end of the adjustable length strap being secured to a shade assembly support, the window mount including a window edge channel and a buckle insert, the buckle insert being lockable to the securing buckle.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 3 is a perspective view of the dual shade assembly with the rearward shade member partially extended from the shade housing, the mounting mat, and identical left and right window securing assemblies each including an adjustable length strap with a securing buckle and a window mount.

FIG. 4 is a perspective view of one of the window mounts of the identical left and right window securing assemblies showing the window edge channel and the buckle insert with the locking aperture formed therethrough.

FIG. 5 is a detail perspective view of one of the left and right window securing assemblies with edge of a vehicle window installed within the window edge channel of the window mount and the buckle of the securing strap positioned for placement over the buckle insert of the window mount.

DESCRIPTION OF THE EXEMPLARY EMBODIMENT

Figure 1:
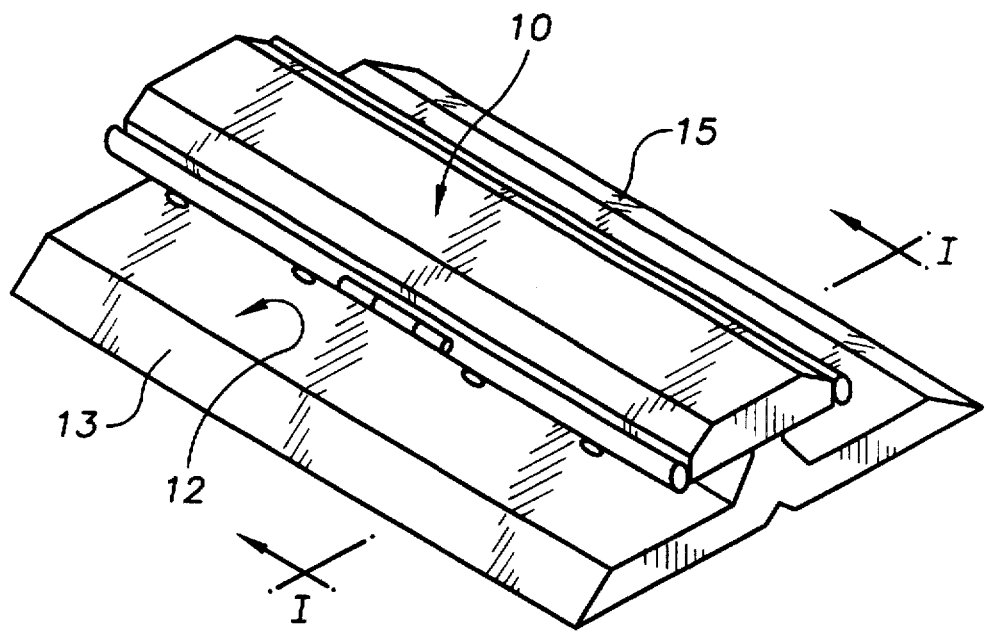
FIG. 1 is a perspective view of exemplary embodiments of the dual shade assembly and mounting mat of the vehicle sun shade system of the present invention.

FIG. 1 shows an exemplary embodiment of the dual shade assembly, generally designated by the numeral 10, and the magnetic mounting mat, generally designated by the numeral 12, of the vehicle sun shade system of the present invention. Magnetic mounting mat 12 is a one-half inch thick section of flexible, plastic magnetic material having a beveled forward edge 13 and a beveled rearward edge 15.

Figure 2:
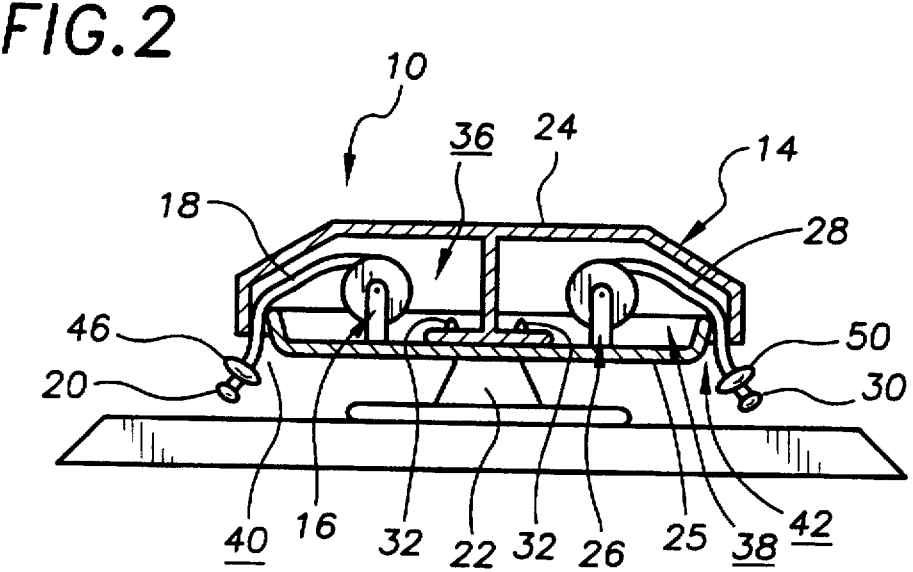
FIG. 2 is a cross-sectional view of the dual shade assembly and mounting mat of FIG. 1 across the line I—I showing the shade housing including the forward shade retraction mechanism, the forward shade member, the forward shade securing suction cups, one of the two shade assembly supports, the aileron shaped upper shade housing cover, the rearward shade retraction mechanism, the rearward shade member, the rearward shade securing suction cups, and the magnetic plastic mounting mat with the forward beveled edge and the rearward beveled edge.

With reference to FIG. 2, dual shade assembly 10 includes a shade housing, generally designated by the numeral 14; a forward shade retraction mechanism, generally designated by the numeral 16; a forward shade member 18; four forward shade securing suction cups 20 (only one shown); two shade assembly supports 22 (only one shown); an aileron shaped upper shade housing cover 24; a tray shaped lower shade housing base 25; a rearward shade retraction mechanism, generally designated by the numeral 26; a rearward shade member 28; four rearward shade securing suction cups 30 (only one shown).

In this embodiment, shade assembly supports 22, upper shade housing cover 24, and lower shade housing base 25 are molded from ultra-violet protected ABS plastic. Shade assembly supports 22 and lower shade housing base 25 are integrally molded together. Upper shade housing cover 24 is snap fit onto mounting pins 32 that extend upwardly from the inner surface of lower shade housing base 25. When shade housing cover 24 is secured to lower shade housing base 25, a forward shade compartment 36 and a rearward shade compartment 38 are defined. Forward shade compartment 36 is accessible through a forward shade opening 40. Rearward shade compartment 38 is accessible through a rearward shade opening 42.

Forward shade member 18 and rearward shade member 28 are each sections of water resistant nylon fabric. Forward shade member 18 is wound onto forward shade retraction mechanism 16 and a leading edge 46 of a forward shade member 18 extends out of forward shade compartment 36 through forward shade opening 40. Rearward shade member 28 is wound onto rearward shade retraction mechanism 26 and a leading edge 50 of rearward shade member 28 extends out of rearward shade opening 42. Forward and rearward retraction mechanism 16,26 are each conventional spring-loaded shade rewind mechanisms.

Figure 7:
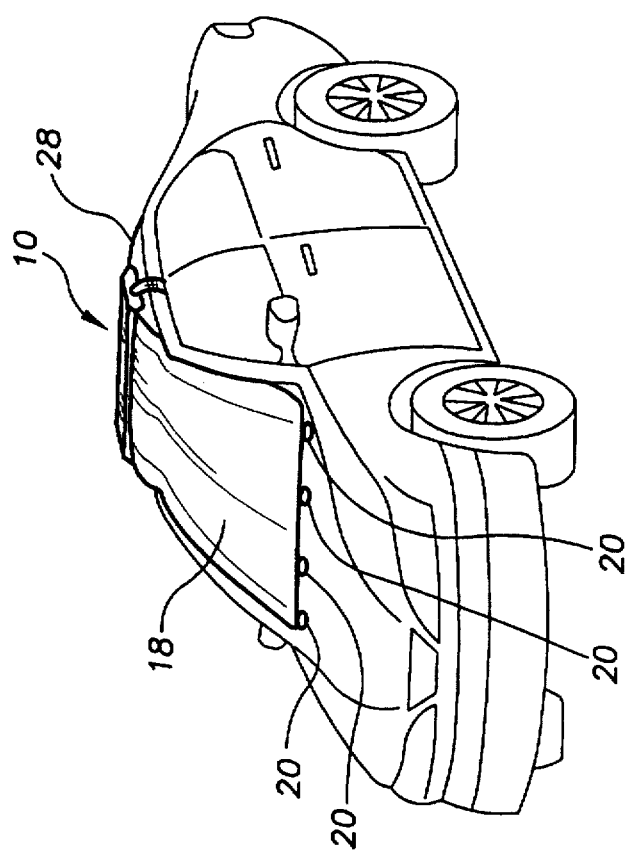
FIG. 7 is a perspective view of the exemplary vehicle sun shade system of FIG. 3 in use with the forward and rearward sun shade members extended over, respectively, the windshield and rear window of the representative vehicle and secured in place, respectively, with the forward and rearward shade securing suction cups.
Figure 6:
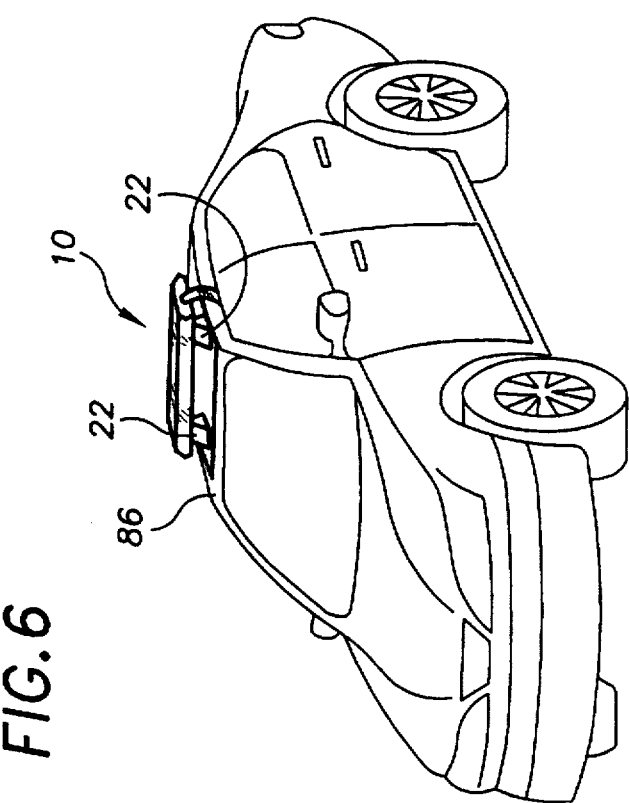
FIG. 6 is a perspective view of the exemplary vehicle sun shade system of FIG. 3 mounted to the roof of a representative vehicle.

Referring now to FIG. 3, the vehicle sun shade system of the present invention includes identical left and right window securing assemblies, generally designated by the numerals 60,62, that each include an adjustable length strap 64 with a securing buckle 66 and a window mount, generally designated by the numeral 68. Referring to FIG. 4, each window mount 68 is formed from steel and includes an edge channel 70 and a buckle insert member 72 that extends perpendicularly from edge channel 70. In this embodiment, buckle insert member 72 is provided with a locking aperture 74. Referring now to FIG. 5, during installation, the edge of a vehicle window 80 is inserted into edge channel 70 (FIG. 4) and then vehicle window 80 is moved into the closed position sandwiching window mount 68 between the edge of vehicle window 80 and the window frame of the vehicle. Securing buckle 66 is then simply clipped and locked onto buckle insert member 72 to further secure dual shade assembly 10, referring now to FIG. 6, in place on top of vehicle roof 86. FIG. 7 shows forward shade member 18 fully extended and secured in place over the windshield of the vehicle with forward shade securing suction cups 20 and rearward shade member 28 fully extended and secured in place over the rear window of the vehicle with rearward shade securing suction cups 30 (shown in FIG. 3).

It can be seen from the preceding description that a vehicle sun shade system has been provided that includes a sun shade device for shading the exterior portion of the vehicle that covers the passenger compartment; that includes at least one retractable shade member that can be deployed from a housing to cover at least a portion of the exterior of the vehicle; that includes at least one mounting system that can be used to install the shade system with little or no prior installation training; and that includes a shade assembly including a shade housing including having a shade member mounted on a shade retraction mechanism in a manner to allow the shade member to be retracted into and deployed from the shade housing, a number of shade securing suction cups secured to leading edge of the shade member, and two shade assembly supports; a flexible, plastic, magnetic mounting mat secured to the shade housing by the shade assembly supports; and left and right window securing assemblies each including an adjustable length strap with a securing buckle and a window mount, the window mount including a window edge channel and a buckle insert, the buckle insert being lockable to the securing buckle.

It is noted that the embodiment of the vehicle sun shade system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense. For instance although the exemplary embodiment is shown as mountable to the vehicle roof it is of course within the scope of the invention to mount an embodiment of the system with only one shade member to the trunk if desired.

What is claimed is:

1. A vehicle sun shade system comprising:
    a shade assembly including a shade housing having a shade member mounted on a shade retraction mechanism in a manner to allow said shade member to be retracted into and deployed from said shade housing, a number of shade securing suction cups secured to leading edge of said shade member, and two shade assembly supports; and
    a flexible, plastic, magnetic mounting mat secured to said shade housing by said shade assembly supports.

2. The vehicle sun shade system of claim 1, further including:
    left and right window securing assemblies, each securing assembly including an adjustable length strap with a securing buckle and a window mount, one end of said adjustable length strap being secured to a shade assembly support, said window mount including a window edge channel and a buckle insert, said buckle insert being lockable to said securing buckle.

3. The vehicle sun shade system of claim 1, wherein:
    said magnetic mounting mat has a beveled forward edge and a beveled rearward edge.

4. The vehicle sun shade system of claim 1 wherein:
    said shade assembly includes a shade housing; a forward shade retraction mechanism; a forward shade member; two shade assembly supports; an upper shade housing cover; a lower shade housing base; and a rearward shade retraction mechanism; a rearward shade member;
    said shade assembly supports and said lower shade housing base being integrally molded together, said upper shade housing cover being snap fit onto mounting pins that extend upwardly from an inner surface of said lower shade housing base.

5. The vehicle sun shade system of claim 4 wherein:

said shade housing cover is secured to said lower shade housing base in a manner to form a forward shade compartment and a rearward shade compartment, said forward shade compartment being accessible through a forward shade opening, said rearward shade compartment being accessible through a rearward shade opening.

6. The vehicle sun shade system of claim 2, wherein:

said magnetic mounting mat has a beveled forward edge and a beveled rearward edge.

7. The vehicle sun shade system of claim 6 wherein:

said shade assembly includes a shade housing; a forward shade retraction mechanism; a forward shade member; two shade assembly supports; an upper shade housing cover; a lower shade housing base; and a rearward shade retraction mechanism; a rearward shade member;

said shade assembly supports and said lower shade housing base being integrally molded together, said upper shade housing cover being snap fit onto mounting pins that extend upwardly from an inner surface of said lower shade housing base.

8. The vehicle sun shade system of claim 7 wherein:

said shade housing cover is secured to said lower shade housing base in a manner to form a forward shade compartment and a rearward shade compartment, said forward shade compartment being accessible through a forward shade opening, said rearward shade compartment being accessible through a rearward shade opening.

9. The vehicle sun shade system of claim 2 wherein:

said shade assembly includes a shade housing; a forward shade retraction mechanism; a forward shade member; two shade assembly supports; an upper shade housing cover; a lower shade housing base; and a rearward shade retraction mechanism; a rearward shade member;

said shade assembly supports and said lower shade housing base being integrally molded together, said upper shade housing cover being snap fit onto mounting pins that extend upwardly from an inner surface of said lower shade housing base.

10. The vehicle sun shade system of claim 9 wherein: said shade housing cover is secured to said lower shade housing base in a manner to form a forward shade compartment and a rearward shade compartment, said forward shade compartment being accessible through a forward shade opening, said rearward shade compartment being accessible through a rearward shade opening.

11. The vehicle sun shade system of claim 3 wherein:

said shade assembly includes a shade housing; a forward shade retraction mechanism; a forward shade member; two shade assembly supports; an upper shade housing cover; a lower shade housing base; and a rearward shade retraction mechanism; a rearward shade member;

said shade assembly supports and said lower shade housing base being integrally molded together, said upper shade housing cover being snap fit onto mounting pins that extend upwardly from an inner surface of said lower shade housing base.

12. The vehicle sun shade system of claim 11 wherein:

said shade housing cover is secured to said lower shade housing base in a manner to form a forward shade compartment and a rearward shade compartment, said forward shade compartment being accessible through a forward shade opening, said rearward shade compartment being accessible through a rearward shade opening.

* * * * *